United States Patent [19]

Hasegawa et al.

[11] 4,089,013

[45] May 9, 1978

[54] FLASHLIGHT INFORMATION SIGNAL GENERATING DEVICE FOR A CAMERA

[75] Inventors: Hiroshi Hasegawa, Tokyo; Yoshiaki Ohtsubo, Kawasaki; Sakuji Watanabe, Yono, all of Japan; Kouichi Takahata, deceased, late of Tokyo, Japan, by Kosaku Takahata, legal successor

[73] Assignee: Nippon Kogaku K.K., Tokyo, Japan

[21] Appl. No.: 789,541

[22] Filed: Apr. 21, 1977

[30] Foreign Application Priority Data

Apr. 30, 1976 Japan .................................. 51-48473

[51] Int. Cl.² .............................................. G03B 15/05
[52] U.S. Cl. ........................................... 354/33; 354/34; 354/145
[58] Field of Search ........................... 354/33, 34, 145; 315/151, 241 P

[56] References Cited

U.S. PATENT DOCUMENTS

| | | | |
|---|---|---|---|
| B 501,503 | 3/1976 | Biber | 354/145 X |
| 3,727,100 | 4/1973 | Kuraishi et al. | 354/33 X |
| 3,978,496 | 8/1976 | Matsumoto | 354/33 |

*Primary Examiner*—L. T. Hix
*Assistant Examiner*—M. L. Gellner

*Attorney, Agent, or Firm*—Fitzpatrick, Cella, Harper & Scinto

[57] ABSTRACT

In a camera having a light receiving element for receiving extraneous light, an integrating capacitor series-connected to the light receiving element, a control circuit for supplying a stop signal to a flashlight device through a connection cord between the camera and the flashlight device to cause the flashlight discharge tube of the flashlight device to stop emitting when the terminal of the capacitor has reached a predetermined value, and a synchro circuit having a synchro terminal and X-contact, there is provided a coil excitable by a current flowing from the flashlight device through the synchro terminal and X-contact, to generate a voltage when the flashlight discharge tube has started to emit, the coil being series-connected to the X-contact, a transistor parallel-connected to the integrating capacitor so that in its conductive position, the transistor enables the capacitor to discharge and in its non-conductive position, the transistor enables the capacitor to be charged, and a switching circuit connected to the coil and the release mechanism of the camera so that upon detection of the voltage generated in the coil, the switching circuit assumes a first position to render the switching element non-conductive and upon completion of shutter release, the switching circuit assumes a second position to render the switching element conductive.

2 Claims, 1 Drawing Figure

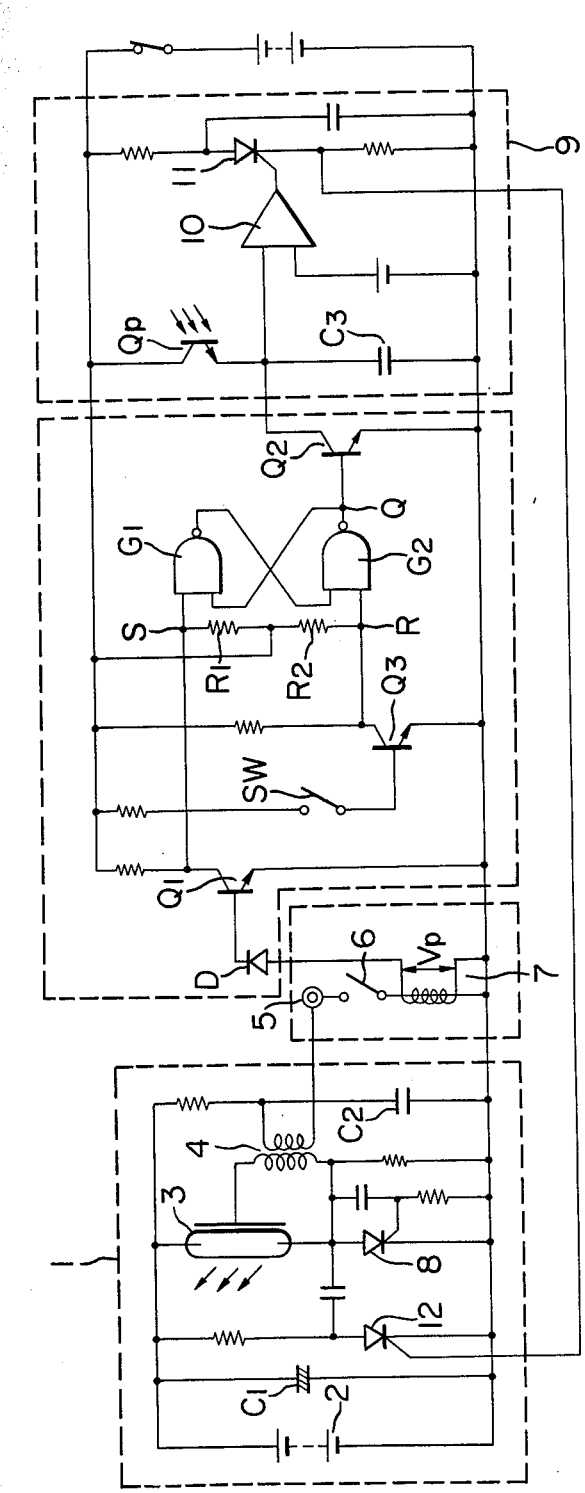

FLASHLIGHT INFORMATION SIGNAL GENERATING DEVICE FOR A CAMERA

BACKGROUND OF THE INVENTION

Field of the Invention

This invention relates to a flashlight information signal generating device for use with a camera, and more particularly, to a device usable, when flashlight photography is to be effected with the camera and a speed light connected together, to generate on the camera side information indicating that the speed light has been triggered.

Recently, in flashlight photography, especially when using an automatic dimming speed light, a number of information transmitting circuits have become necessary between the camera and the speed light to display, for example, the success or failure of the automatic dimming device to function or, if the camera is of the type which is capable of TTL dimming, to transmit the output signal of the metering circuit of the camera. Points of connection for such information transmitting circuits have been located within accessory shoes provided for the camera and speed light, and the number of such points of connection has necessarily been increased.

However, the number of such points of connection available within these accessory shoes is limited due to the construction thereof and, accordingly, the amount of information transmittable between the camera and the speed light becomes limited unless special transmitting means is provided.

SUMMARY OF THE INVENTION

We have conceived and contribute by the present invention, a flashlight information signal generating device for use with a camera which generates on the camera side part of the information heretofore obtained on the speed light side, in order substantially to increase the amount of information transmittable between the camera and the speed light.

The present invention is based on the recognition of the fact that where flashlight photography is effected with a camera and a speed light connected together, electrical energy from the speed light side flows through the synchro circuit of the camera during the flashlight emission of the speed light, and the invention uses such electrical energy as the flashlight information signal generating source.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWING

Specific embodiments of the invention have been chosen for purposes of illustration and description, and are shown in the accompanying drawings, forming a part of the specification wherein the single FIGURE is a circuit diagram showing an embodiment of the present invention.

DESCRIPTION OF THE PREFERRED EMBODIMENT

Referring to the drawing which shows an embodiment of the present invention as applied to a TTL automatic dimming speed light, a main capacitor C1 and a trigger capacitor C2 in a flashlight emitting section 1 are charged by a power source 2. A trigger coil 4 for exciting a flashlight discharge tube 3 has its primary winding connected through a synchro terminal 5 to the X-contact 6 of the camera.

In the synchro circuit of the camera, including the X-contact 6, there is provided a pickup coil 7 for generating the flashlight information.

When the X-contact 6 is closed, the charge stored in the trigger capacitor C2 is discharged through the primary winding of the trigger coil 4. Thus, the flashlight discharge tube 3 is excited by a high tension pulse generated in the secondary winding of the trigger coil 4, while at the same time, a first SCR 8 conducts, so that the flashlight discharge tube 3 starts its flashlight emission.

When this occurs, a resonance current resulting from the inductance of the trigger coil 4 and the capacitance of the trigger capacitor C2 flows through the synchro terminal 5 to the synchro circuit of the camera. By this current, the pickup coil 7 is excited to momentarily generate a voltage $V_p$ thereacross. This terminal voltage is used as the flashlight information signal.

A transistor Q1 is momentarily turned on by means of the voltage $V_p$ acting through a rectifying diode D, whereupon the output terminal Q of R.S. flip-flop circuit comprising resistors R1, R2 and AND gates G1, G2 assumes a low current level, thus turning off a transistor Q2.

The flashlight emitted from the flashlight discharge tube 3 illuminates an object, and the reflected light therefrom passes through an unshown picture-taking lens of the camera to a phototransistor $Q_p$ in a light receiving section 9 contained within the camera. The quantity of light received by this phototransistor $Q_p$ is progressively stored as a quantity of electricity in an integrating capacitor C3 until it reaches a predetermined value, whereupon a comparator circuit 10 causes a second SCR 11 to conduct. Upon conduction of this second SCR 11, a third SCR 12 in the flashlight emitting section 1 conducts reversely to bias and turn off the first SCR 8.

In this manner, automatic dimming flashlight photography is accomplished and, upon completion of shutter release, when an unshown rear shutter curtain of the camera is closed, a switch SW is closed to turn on a transistor Q3, so that the output terminal Q of the R.S. flip-flop circuit assumes high current level. Thus, the transistor Q2 is turned on to reset the integrating capacitor C3 in preparation for the next flashlight emission.

While the present invention has been described as being applied for the resetting of the integrating capacitor of the TTL automatic dimming speed light, other various applications may be possible including the resetting of the display on the camera for the indication of the success or failure of the dimming.

According to the present invention, as has been described above, where flashlight photography is to be effected with a speed light connected to a camera, the flashlight information signal is generated by electrical energy flowing from the speed light to the synchro circuit of the camera upon closing of the X-contact of the camera and this eliminates the necessity of providing any special information transmitting circuit between the camera and the speed light, and it is possible substantially to increase the amount of information transmittable through the accessory shoes of the camera and the speed light.

What is claimed is:

1. In a camera having a light receiving element for receiving extraneous light, an integrating capacitor series-connected to said light receiving element, a control circuit for supplying a stop signal to a flashlight device and connectable to said camera through a connection means connected between said camera and said flashlight device, to cause the flashlight discharge tube of said flashlight device to stop emitting when the terminal of said capacitor has reached a predetermined value, and a synchro circuit having a synchro terminal and X-contact, the combination therewith comprising:

a coil series-connected to said X-contact and excitable by a current flowing from said flashlight device through said synchro terminal and X-contact to generate a voltage when said flashlight discharge tube has started to emit;

switching means parallel-connected to said integrating capacitor so that in its conductive position said switching means enables said capacitor to be charged; and a switching circuit connected to said coil and the release mechanism of said camera so that upon detection of the voltage generated in said coil, said switching circuit assumes a first position to render said switching means non-conductive and upon completion of shutter release, said switching circuit assumes a second position to render said switching means conductive.

2. A camera according to claim 1, wherein said switching circuit is an R.S. flip-flop circuit.

* * * * *